April 5, 1966  R. K. JEHLE ETAL  3,244,035
TREPANNING DRILL TOOL
Filed Sept. 21, 1965  2 Sheets-Sheet 1
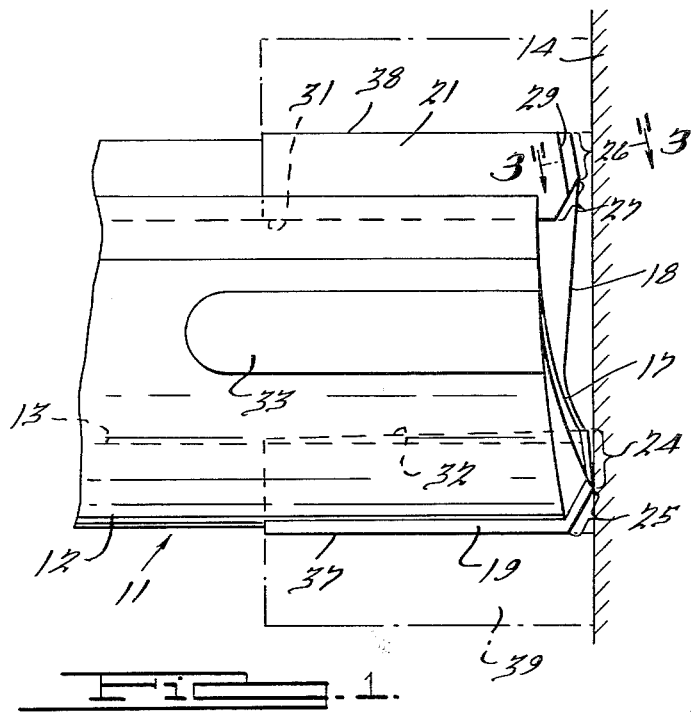
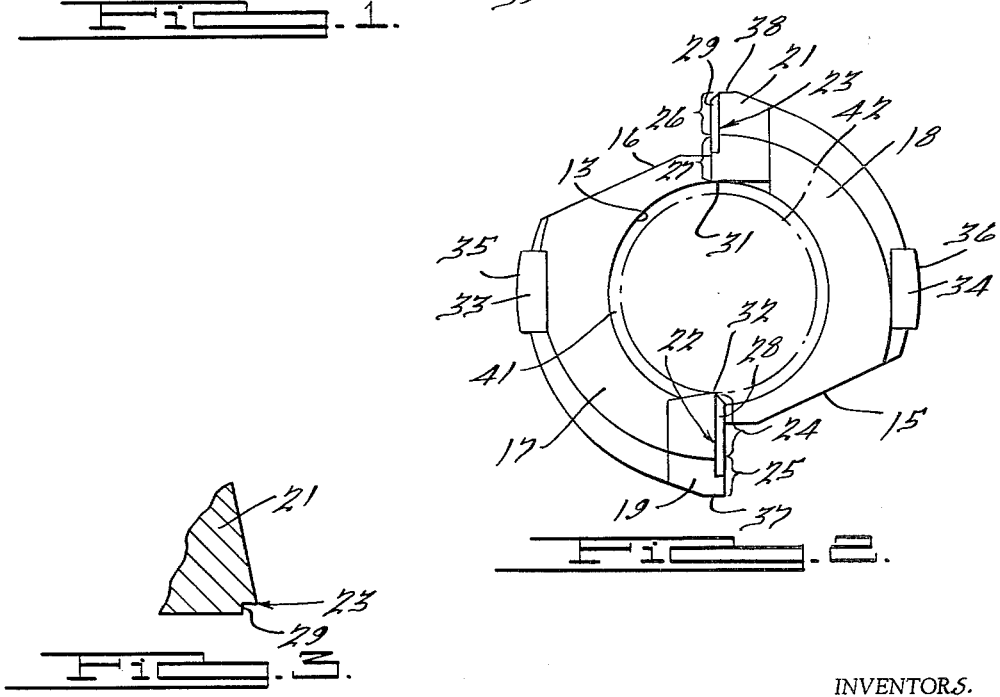
INVENTORS.
Raymond K. Jehle.
Kurt Wilinski.
BY
Harness, Dickey & Pierce
ATTORNEYS

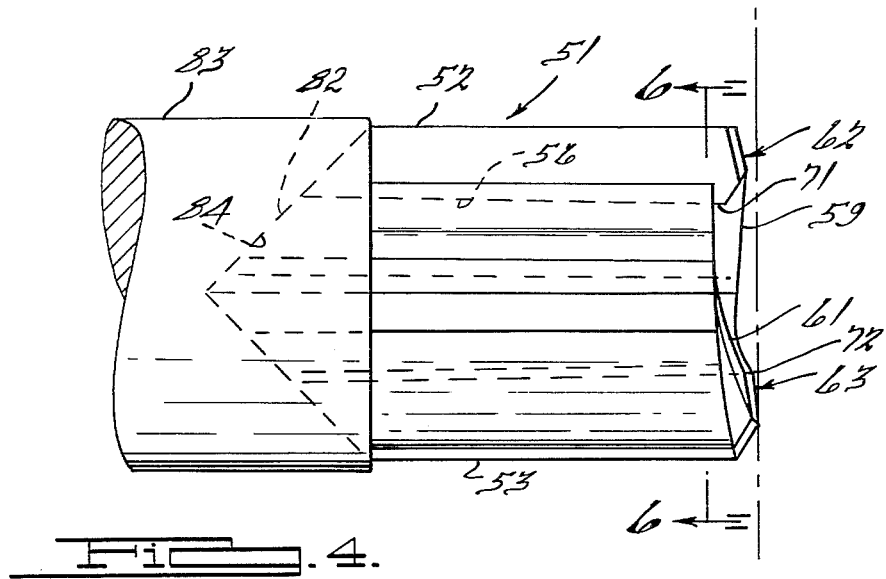
Fig. 4.
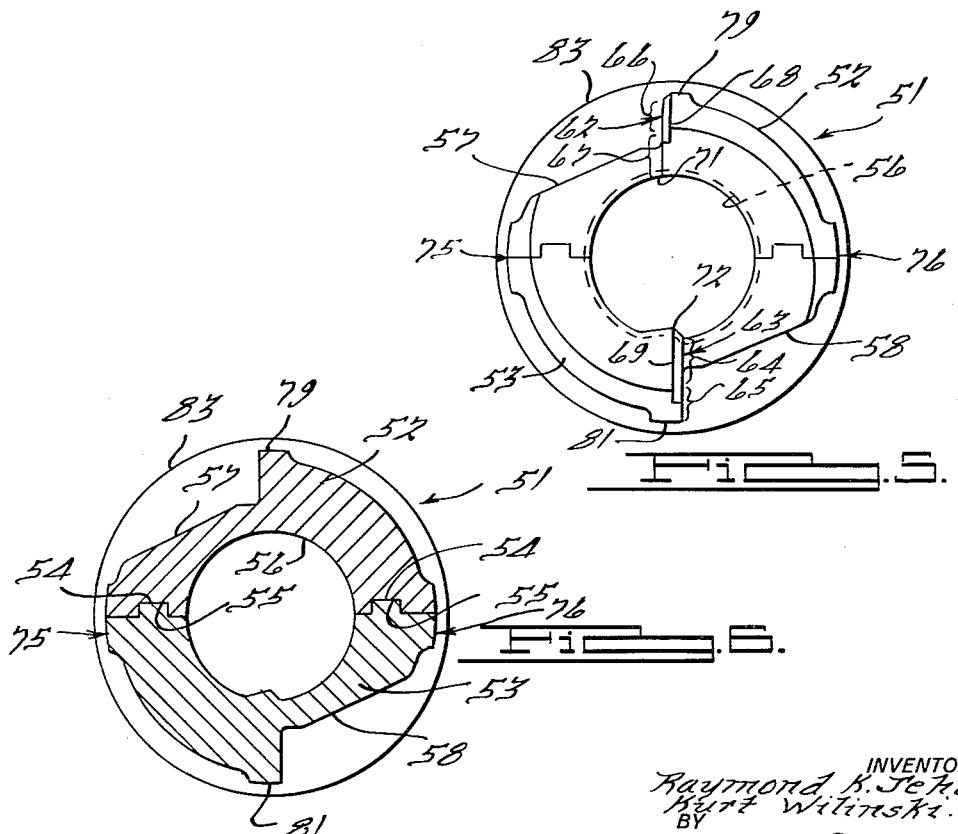
Fig. 5.
Fig. 6.
INVENTORS.
Raymond K. Jehle
Kurt Wilinski.
BY
Carner, Dickey & Pierce
ATTORNEYS.

3,244,035
TREPANNING DRILL TOOL
Raymond K. Jehle, Allen Park, and Kurt Wilinski, Center Line, Mich., assignors to Ex-Cell-O Corporation, Detroit, Mich., a corporation of Michigan
Filed Sept. 21, 1965, Ser. No. 493,612
4 Claims. (Cl. 77—69)

This invention relates to drill tools and more particularly to trepanning drill tools intended for drilling relatively deep holes, and this application is a continuation-in-part of application Serial Number 233,049, filed October 25, 1962 and having the same title.

It is an object of the invention to provide a novel and improved trepanning drill tool which facilitates the removal of chips by coolant flushing and reduces the possibility of clogging of the chip removal flutes.

It is another object to provide an improved trepanning drill tool of this nature which permits the balancing of cutting thrust forces on the drill.

It is a further object to provide an improved trepanning drill tool of this character which is relatively inexpensive to manufacture.

Other objects, features, and advantages of the present invention will become apparent from the subsequent description, taken in conjunction with the accompanying drawings, in which:

FIGURE 1 is a side elevational view of a first embodiment of a trepanning drill tool;

FIGURE 2 is an end elevational view of the tool shown in FIGURE 1;

FIGURE 3 is a fragmentary cross-sectional view taken along the line 3—3 of FIGURE 1 and showing a chip breaker shoulder.

FIGURE 4 is a side elevational view, in part similar to FIGURE 1, showing another embodiment of a trepanning drill tool;

FIGURE 5 is an end elevational view of the tool shown in FIGURE 4; and

FIGURE 6 is a cross-sectional view taken along the line 6—6 of FIGURE 4.

Briefly, the illustrated embodiments of the invention comprise a drill body having a central bore and two diametrically opposed cutting edges at the cutting end thereof. One cutting edge is adapted to cut the outside diameter of the annular hole to size, but is relieved at its inner portion. The other cutting edge is adapted to remove the inner portion of material from the annular hole being cut, thereby determining the size of the central pin of stock which is left after the drilling is completed. This second cutting edge is relieved at its outer portion. Two chip removal flutes are formed in the body, extending upwardly from the two cutting edges. Each flute will therefore carry the chips from only its own cutting edge, the width of the chips in each case being only part of the total width of the annular hole being cut. An annular space is provided between the inner diameter of the drill body and the outer diameter of the stock pin as determined by the cutting edge that cuts the inner hole portion. Coolant may be forced through this annular opening and will return through the flutes, flushing out the chips. Two diametrically opposed wear pads are provided on the body between the cutting edges, and a slight inward clearance taper extends from the cutting end of the tool.

In one embodiment of the invention, the cutting edges and wear pads are provided by separate inserts that are carried by a body portion. In another embodiment of the invention, the cutting edges and wear pads are formed integrally with the body.

Referring more particularly to the drawings and specifically to the embodiment of FIGURES 1-3, the drill is generally indicated at 11 and comprises a body shown partially at 12. Body 12 is of elongated shape, having a generally cylindrical outer surface slightly less in diameter than the annular hole to be cut by the drill, and an inner bore 13 which is slightly larger in diameter than the stock pin which will be cut from work 14.

Two flutes 15 and 16 are formed in the sides of body 12. These flutes are diametrically opposed and may be of any appropriate shape for chip removal, bearing in mind that the remaining strength of body 12 must be sufficient to provide the desired rigidity during the drilling operation.

The cutting end of body 12 has two relieved portions 17 and 18 extending away from flutes 15 and 16, respectively, and two cutting tool inserts 19 and 21 are mounted at the higher ends of these relieved portions by brazing or some other appropriate method. Inserts 19 and 21 may be formed of tungsten carbide or the like, and have cutting edges indicated generally at 22 and 23, respectively.

Cutting tool insert 19 is intended to cut the inner portion of the annular hole to be drilled by drill 11. For this purpose, the zone of edge 22 indicated at 24 in FIGURE 2 is formed as a cutting edge, while the zone indicated at 25 is relieved. Tool insert 21 is intended to remove the outer portion of the annular hole being cut by drill 11. For this purpose, zone 26 of edge 23 is provided with a cutting edge, while zone 27 is relieved.

Cutting edges 24 and 26 may be provided with chip breakers in the form of shoulders 28 and 29, respectively. Shoulder 29 is seen in FIGURE 3, the chips cut by edge 23 engaging this shoulder and being broken. The inner edge 31 of insert 21 is flush with the inner surface 13 of tool body 12, as seen in FIGURE 1. The inner edge 32 of insert 19 is tapered outwardly in a direction away from the cutting end of drill 11. At the cutting end, inner edge 32 of insert 19 is at the diameter of the stock pin to be formed when the drill is operated. The taper of edge 32 will provide clearance so that friction between drill 11 and the pin formed by the drilling will be minimized.

A pair of wear pad inserts 33 and 34 are mounted in diametrically opposed relation at the cutting end of drill 11. These inserts are mounted in body 12 by brazing or like method, and may be fabricated of tungsten carbide or similar material. The convex outer surfaces 35 and 36 of wear pads 33 and 34, respectively, are formed together with the outer surface portions 37 and 38 of inserts 19 and 21, respectively, so as to taper back slightly from the outer diameter of the annular hole being drilled, as defined by the outer end of cutting edge 26. In other words, these four surfaces are included in a common frusto-conical surface, and because of their taper, friction due to contact with work 14 will be minimized. Major portions of the outer surfaces of inserts 19 and 21 are relieved from surface portions 37 and 38 and are contiguous with the outer surface of body 12 as shown in FIGURE 2.

The construction of drill 11 is such that any point on cutting zone 24 or 26 which is diametrically opposite a point on relieved zone 27 or 25 (the two points being equidistant from the central drill axis) will have an axial lead with respect to the point on the relieved zone, thus preventing interference by the relieved zones during drilling. In the illustrated embodiment, the inner portion of cutting zone 26 slightly overlaps the outer portion of cutting zone 24, but zone 25 is relieved rather sharply from zone 24 and will not interfere with the main portion of cutting zone 26. The relative proportions of the total stock removed may be divided between zones 24 and 26 to suit individual requirements; however, each of these two cutting zones will normally be about equal in size so as to evenly divide the amount of chips traveling upwardly through flutes 15 and 16. The direction and amount of angular clearance or relief of edges 24 and 26 in a radial direction, as seen in FIGURE 1, may also be varied in order to achieve properly balanced thrust and radial forces on the drill body during the drilling operation. It should be noted that the relative positions or lead between cutting edge zones 24 and 26 in an axial direction are not critical.

In operation, drill 11 will normally be guided by a bushing indicated in phantom lines at 39 in FIGURE 1 as it begins to drill work 14. During the drilling operation, coolant will be forced downwardly through the annular space indicated at 41 in FIGURE 2 which exists between the stock pin being formed by the drilling operation and inner surface 13 of body 12; the stock pin is indicated by phantom lines at 42 in FIGURE 2.

The coolant will flush away chips being formed by cutting edge zones 24 and 26 and broken by chip breaker shoulders 28 and 29, the chips being flushed upwardly through flutes 15 and 16. Wear pads 35 and 36 will engage the outer diameter of the annular hole being cut by the drill and may create a burnishing effect.

Because of the presence of two flutes 15 and 16 and the fact that the chips entering each flute come from a tool insert which only cuts a portion of the annular hole, the amount and size of the chips will be relatively small, and the danger of chips clogging the flutes will be greatly reduced. Drilling may thus continue at an unimpeded pace, a procedure which could be quite important, especially in the case of drilling certain exotic metals which tend to work-harden if the tool is stopped in one position for any appreciable length of time.

The embodiment shown in FIGURES 4 through 6 is similar in many respects to the embodiment shown in FIGURES 1 through 3 and also provides the same advantages as that embodiment. The embodiment shown in FIGURES 4 through 6, however, does not employ separate wear pads and cutting tip inserts but consists of a solid body of material in which the wear pads and cutting edges are formed. The material employed may be tungsten carbide or other similar well known cutting materials.

Referring now specifically to the embodiment shown in FIGURES 4 through 6, a cutting tool embodying the invention is identified generally by the reference numeral 51. The cutting tool 51 is made up of two halves 52 and 53 (FIGURE 6), one of which is formed with tongues 54 that extend into grooves 55 formed on the other half. The halves 52 and 53 are welded, brazed or otherwise secured together. By forming the tool from two halves, it is possible to maintain a greater degree of tolerance on the finished size and fabrication is facilitated.

The cutting tool 51 is of elongated, generally cylindrical shape and has an outer diameter that is somewhat smaller than the finished outer diameter machined by the tool 51. The halves 52 and 53 form an inner bore 56 that is somewhat larger in diameter than the stock pin that is cut from the work.

Two flutes 57 and 58 are formed in diametrically opposed sides of the cutting tool 51, one flute being formed in each of the two halves. The flutes 57 and 58 may be of any appropriate shape for chip removal, bearing in mind that the remaining strength of the tool 51 must be sufficient to provide the desired rigidity during the drilling operation. The cutting end of the tool 51 has two relieved portions 59 and 61 extending away from the flutes 58 and 57, respectively. Cutting edges 62 and 63 are formed adjacent the relieved portions 59 and 61 at diametrically opposite sides of the tool 51.

The cutting edge 63 cuts the inner portion of the annular hole to be drilled by the tool 51 and forms the stock pin. For this purpose, the zone of the edge 63 indicated at 64 in FIGURE 5 is formed as a cutting surface while the zone indicated at 65 is relieved. The cutting edge 62 cuts the outer portion of the annular hole cut by the tool 51 and for this purpose a zone 66 of the cutting edge 62 is provided with the cutting surface. The remaining zone 67 is relieved.

The cutting edges 62 and 63 may be provided with chip breakers in the form of shoulders 68 and 69, respectively. The chips cut by the edges 62 and 63 engage the shoulders 68 and 69 and are broken thereby. The inner edge 71 of the cutting edge 62 is flush with the inner surface 56 of the tool 51. The inner edge 72 of the cutting edge 63 is tapered outwardly in a direction away from the cutting end of the tool 51. At the cutting end, the inner edge 72 is at the diameter of the stock pin to be formed when the tool 51 is operated. The taper of the edge 72 will provide clearance so that friction between the tool 51 and the pin formed by the cutting operation will be minimized.

A pair of wear pads 75 and 76 are formed on diametrically opposite sides of the tool 51. The wear pads 75 and 76 have convex outer surfaces which with outer surfaces 79 and 81 of the cutting edges 62 and 63 taper back slightly from the outer diameter of the annular hole being cut, as defined by the end of the cutting edge 66. In other words, these four surfaces are inclined in a common frusto-conical surface and because of their taper friction due to contact with the work will be minimized.

The construction of the tool 51 is such that any point on the cutting zone 66 or 64 which is diametrically opposite to a point on the relieved zone 65 or 67 will have an axial lead with respect to the point on the relieved zone. This prevents interference by the relieved zones during the cutting operation. The inner portion of the cutting zone 66 slightly overlaps the outer portion of the cutting zone 64 but the zone 67 is relieved rather sharply from the zone 65. The relative portions of the total stock removed may be divided between the zones 66 and 63 to suit individual requirements. Preferably, each of the two cutting zones will normally be about equal in size so as to evenly divide the amount of chips traveling upwardly through the flutes 57 and 58. The direction and amount of angular clearance or relief of the edges 67 and 65 in a radial direction may also be varied in order to achieve properly balanced thrust and radial forces on the drill body during operation. It should be noted that the relative positions or lead between the cutting edge zones 66 and 64 in an axial direction are not critical.

The tool 51 operates in the same manner as the embodiment shown in FIGURES 1 through 3 and coolant may be forced between the annular space between the stock pin being removed and the inner diameter 56 to flush chips upwardly through the flutes 57 and 58. As in the previously described embodiment, the wear pads 75 and 76 engage the outer diameter of the annular hole being cut by the drill and may create a burnishing effect.

If desired, the tool 51 may be formed with a conical surface 82 at the end opposite to the cutting end for attachment to a support arbor 83 formed from a less costly material. The conical surface 82 mates with a complementary surface 84 of the arbor 83 to offer an increased area for a joining braze.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a trepanning drill tool for drilling an annular hole having an inner diameter and an outer diameter, a drill body having a generally cylindrical outer surface of lesser diameter than said outer diameter and a central bore of greater diameter than said inner diameter, the cutting end of said drill body having a first cutting edge having an inner cutting zone extending outwardly from said inner diameter to a first intermediate point between said first and inner diameters and a relieve zone extending outwardly from said first intermediate point, a second cutting edge diametrically opposed to said first cutting edge and having an outer cutting zone extending inwardly from said outer diameter and to a second intermediate point slightly inwardly of said first intermediate point and a relieve zone extending inwardly from said second intermediate point, chip breaker shoulders formed adjacent each of said cutting zones, and a pair of diametrically opposed wear pads formed between said cutting edges, at least portions of the outer surfaces of said wear pads and said cutting edges being contained in a common frusto-conical surface tapering inwardly in a direction away from the cutting end of said drill.

2. In a trepanning type drill for drilling an annular hole having an inner diameter and outer diameter, an elongated drill body, a first tool insert carried by said drill body, the cutting edge of said tool having a cutting zone extending outwardly from said inner diameter to a first intermediate point between said inner and outer diameters and a relieved zone extending outwardly from said first intermediate point, and a second cutting tool insert spaced circumferentially from said first insert, the cutting edge of said second cutting tool insert having a cutting zone extending inwardly from said outer diameter to a second intermediate point slightly inwardly from said first intermediate point, and a relieved zone extending inwardly from said second intermedaite point, first and second flutes formed in said drill body and extending axially from said first and second tool inserts, respectively, and first and second wear pad inserts carried by said drill body and positioned between said tool inserts, at least portions of the outer surfaces of said tool inserts and wear pad inserts being contained in a common frusto-conical surface tapered inwardly in a direction away from the cutting end of said drill.

3. In a trepanning type drill for drilling an annular hole having an inner diameter and an outer diameter, an elongated drill body, a first cutting edge at the cutting end of said drill body, said first cutting edge having a cutting zone extending outwardly from said inner diameter to a first intermediate point between said inner and outer diameters and a relieved zone extending outwardly from said first intermediate point, a second cutting edge spaced circumferentially from said first cutting edge, said second cutting edge having a cutting zone extending inwardly from said outer diameter to a second intermediate point slightly inward from said first intermediate point and a relieve zone extending inwardly from said second intermediate point, first and second flutes formed in said drill body and extending axially from said first and said second cutting edges, and first and second wear pads between said cutting edges, at least a portion of the outer surfaces of said cutting edges and said wear pads being contained in a common frusto-conical surface tapered inwardly in a direction away from the cutting end of said drill.

4. In a trepanning type drill tool for drilling an annular hole having an inner diameter and an outer diameter, a drill body having a generally cylindrical outer surface of lesser diameter than said outer diameter and a central bore of greater diameter than said inner diameter, a first tool insert having a cutting edge with an inner cutting zone extending outwardly from said inner diameter to a first intermediate point between said inner and outer diameters, and a relieved zone extending outwardly from said first intermediate point, a second tool insert on said body diametrically opposed to said first insert and having a cutting edge with an outer cutting zone extending inwardly from said outer diameter and to a second intermediate point slightly inwardly of said first intermediate point and a relieved zone extending inwardly from said second intermediate point, chip breaker shoulders formed on said tool inserts adjacent the cutting zones thereof, and a pair of diametrically opposed wear pad inserts carried by said body between said tool inserts, at least portions of the outer surfaces of said wear pad and tool inserts being contained in a common frustoconical surface tapering inwardly in a direction away from the cutting end of said drill.

No references cited.

WILLIAM W. DYER, JR., *Primary Examiner.*

F. S. HUSAR, *Assistant Examiner.*